No. 672,151. Patented Apr. 16, 1901.
E. M. MORGAN.
ANESTHETIC INHALER.
(Application filed Nov. 6, 1900.)
(No Model.)
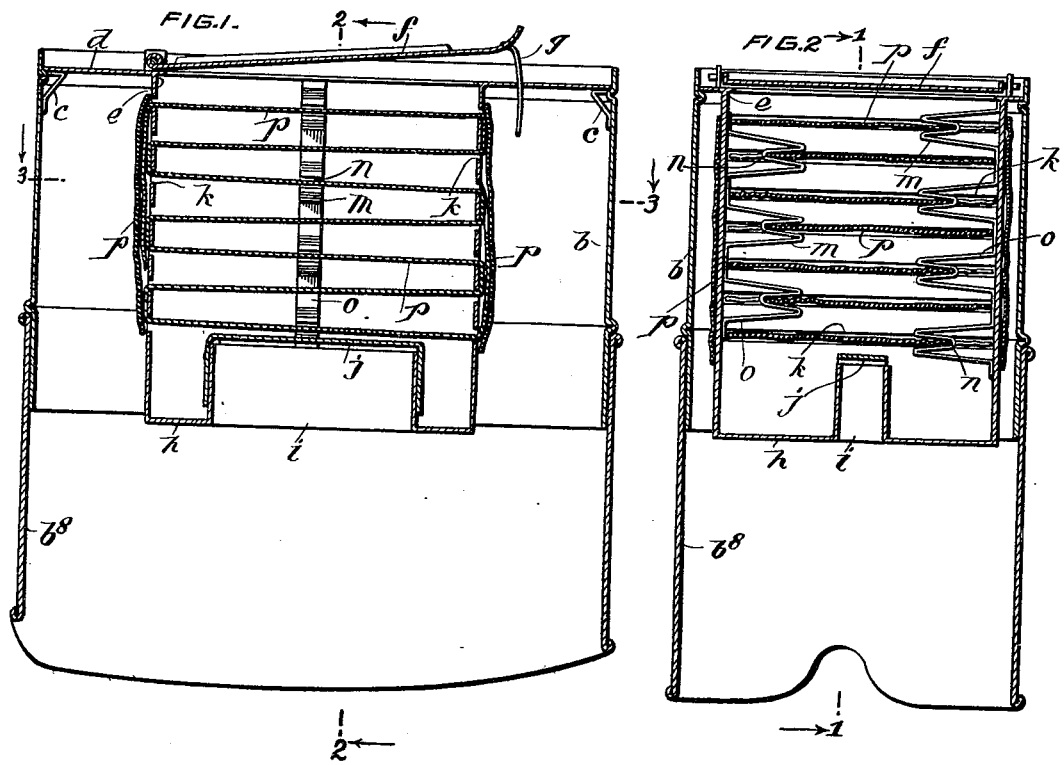
EDWARD MOMPESSON MORGAN, Inventor

UNITED STATES PATENT OFFICE.

EDWARD MOMPESSON MORGAN, OF WESTMOUNT, CANADA.

ANESTHETIC-INHALER.

SPECIFICATION forming part of Letters Patent No. 672,151, dated April 16, 1901.

Application filed November 6, 1900. Serial No. 35,688. (No model.)

*To all whom it may concern:*

Be it known that I, EDWARD MOMPESSON MORGAN, doctor of medicine, of the town of Westmount, district of Montreal, Province of Quebec, Canada, have invented certain new and useful Improvements in Anesthetic-Inhalers; and I do hereby declare that the following is a full, clear, and exact description of the same.

The object of my invention is to enable the administering of the anesthetic to be under the perfect control of the physician both as to the quantity and strength thereof.

To this end the invention may be said briefly to comprise an inhaler part proper wherein a series of layers of absorbent material are located and arranged to lie horizontally and one above the other when the inhaler is in use, means for displacing the alternate opposite edges of the absorbent layers, a valve for regulating the quantity of air inhaled, and a guard extending completely across the bottom of the inhaler proper to protect the patient's face.

For full comprehension, however, of my invention reference must be had to the accompanying drawings, forming a part of this specification, in which similar reference characters indicate like parts, and wherein—

Figure 1 is a longitudinal vertical sectional view of my improved inhaler, taken on line 1 1, Fig. 2. Fig. 2 is a transverse vertical sectional view thereof, taken on line 2 2, Fig. 1; and Fig. 3 is a horizontal sectional view taken on line 3 3, Fig. 1.

The carrying part or hood $b$ is open at both ends, the lower end conforming to the features of a patient and the upper end having a pair of brackets $c$, upon which rests a plate $d$, having the inhaler proper depending therefrom. This hood is divided horizontally, and the lower part $b^8$ is adapted to be fitted over the upper part $b$ to facilitate the carrying thereof. This plate $d$ is formed with an opening in the middle thereof, to the edges of which the edge of the open top $e$ of my inhaler proper is rigidly connected, and a hinged valvular cover $f$ closes this opening and is furnished with a finger $g$, curved concentrically of the hinge, whereby the cover can be held open to a variable extent.

My improved inhaler proper consists of a rectangular box the bottom $h$ whereof has an oblong tubular port $i$, the open inner end whereof is partially closed by a strap $j$, which constitutes a guard to prevent the liquid anesthetic falling therethrough. The ends of the box are formed with a series of horizontal slots $k$, and the interior of the opposite sides are each furnished with a series of inward projections $m$, alternating with one another and in line with the slots $k$. These projections are formed with notches $n$ in their ends and are constituted by a pair of strips $o$, bent to the form shown in Fig. 2. A bandage $p$ is passed through these slots from top to bottom of the box to form a series of layers and is finally wrapped around said box, while the middle portion of one side edge of each layer is held from the side of the box by taking into one of the notches $n$, thus providing a zigzag passage from the top to the bottom of the box.

In practice the draft due to inhalation by the patient is controlled by the valve $f$, while the fact of the bottom of the inhaler-box being completely and permanently closed, except for the slits at each side of the guard-strip $j$, effectively protects the patient's face from the dropping of the inhalant from the layers of bandage which are kept constantly saturated therewith by sprinkling through the valvular cover $f$.

It is obvious that the above construction will provide an inhaler that can readily be rendered aseptic, owing to the fact that it can be completely disassembled and the part thereof boiled or otherwise cleansed or renewed at will.

What I claim is as follows:

1. An inhaler comprising a box slotted at opposite points, a bandage passed through said slots and across the interior of said box in zigzag form, and a series of inward projections engaging the middle of the alternate opposite edges of the layers of said bandages, holding the same from the side of the box, substantially as described.

2. An inhaler comprising a box having a closed bottom with a tubular port projecting into said box, a guard-strap rigidly secured to said tubular port for guarding same and an absorbent material within said box, substantially as described and for the purpose set forth.

3. An inhaler comprising a box having a closed bottom with an oblong tubular port, a guard-strap rigidly secured to said tubular port and an absorbent material within said box, substantially as described and for the purpose set forth.

4. An inhaler comprising a hood open at both ends, a pair of brackets upon the interior of the upper end of said hood, a plate resting upon said brackets and having an opening in its middle, a hinged cover for closing said opening, a curved finger carried by the free end of said cover and taking through a perforation in said plate, a box suspended from the edges of said opening and having an intact bottom, a guarded port in said bottom, and an absorbent material suspended in said box, substantially as described and for the purpose set forth.

5. An inhaler comprising a hood open at both ends, a plate having an opening in its middle, means for supporting said plate at the upper end of said hood, a hinged cover for closing said opening, a curved finger carried by the free end of said cover and taking through a perforation in said plate, a box suspended from the edges of said opening and having an intact bottom, a guarded port in said bottom, and an absorbent material suspended in said box, substantially as described and for the purpose set forth.

In testimony whereof I have affixed my signature in presence of two witnesses.

EDWARD MOMPESSON MORGAN.

Witnesses:
WILLIAM P. McFEAT,
FRED J. SEARS.